Patented Sept. 18, 1928.

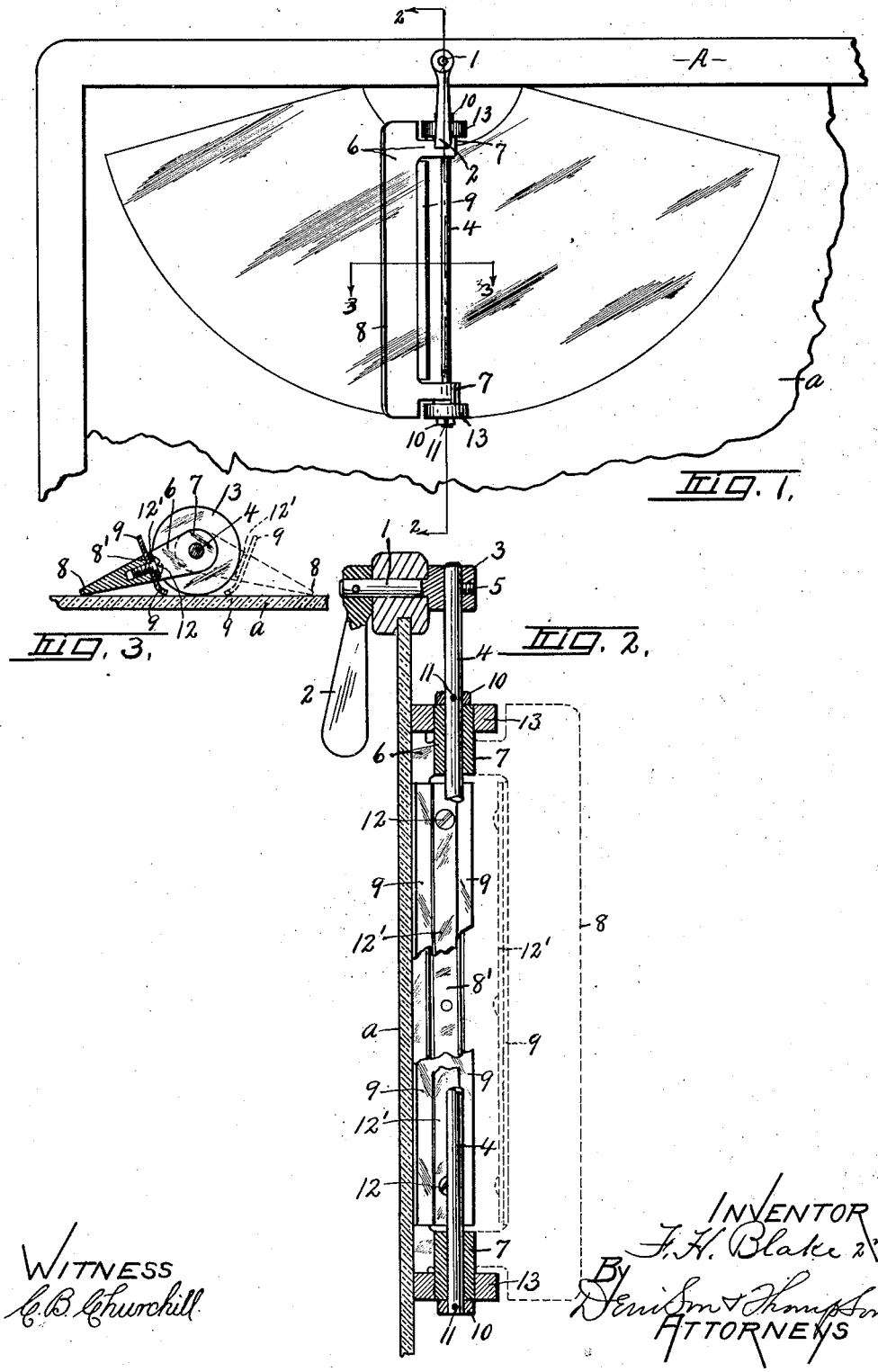

1,684,907

UNITED STATES PATENT OFFICE.

FRANCIS H. BLAKE, 2D, OF CLAYTON, NEW YORK.

WINDSHIELD CLEANER.

Application filed July 15, 1927. Serial No. 205,988.

This invention relates to a windshield cleaner of the oscillating type in which a rock shaft journaled on the windshield frame is provided with a radially extending arm movable across the windshield glass and upon which is journaled a frame carrying a scraper and a wiper together with suitable rollers contacting with the surface of the glass for effecting an angular movement of the frame and resultant reversal of the scraper and wiper against the glass as the arm with the frame thereon is reciprocated in reverse directions.

The main object is to provide a self-reversing cleaner having means for removing ice, snow, and other solid matter which may accumulate against the surface of the glass and additional means for removing rain and moisture from said glass.

Other objects and uses relating to specific parts of the device will be brought out in the following description.

In the drawings:—

Figure 1 is a face view of a portion of the windshield and my improved cleaner in operative position.

Figure 2 is an enlarged sectional view taken in the plane of line 2—2, Figure 1.

Figure 3 is an enlarged transverse sectional view taken in the plane of line 3—3, Figure 1.

This device is adapted to be attached to the frame —A— of a windshield glass —a— and comprises a rock shaft —1— extending transversely through an opening in the top rail of the frame —A—, said shaft having its rear end provided with an operating handle —2—.

The front end of the shaft —1— is provided with a head —3— having a transverse opening therethrough for receiving one end of a radially extending arm —4— which is secured in the hub —3— by means of a set screw —5— or equivalent fastening means and extends across the front face of the windshield parallel therewith.

A frame —6— is provided with axially spaced hubs —7— journaled upon the arm —4— for relative angular movement and is provided at one side of its axle with scrapers —8— and opposite wipers —9—.

This frame —6— is held in operative position upon the arm —4— by collars —10— which are secured by pins —11— to the arm —4— to engage the outer ends of the hubs —7— and thereby to hold the frame against axial movement on its supporting arm —4—.

The intermediate portion of the side of the frame —6— adjacent the arm —4— is cut away to form a substantially flat surface —8′— against which the wipers —9— are secured by screws —12— or equivalent fastening means.

This frame —6— extends laterally or radially mainly to one side of its supporting rod —4— and has its opposite sides tapered or convergent to the scraper edge —8— which is relatively narrow but flat and parallel with the surface —8′— against which the wipers —9— are clamped so as to form opposite scraping corners adapted to ride against the front surface of the glass as the cleaner is operated in reverse directions by means of the handle —2—.

The means for effecting the angular adjustment or reversal of the frame —6— upon its supporting rod comprises a pair of rollers —13— secured to the outer ends of the hubs —7— adjacent the collars —10— and adapted to roll against the front surface of the glass —a— and thereby to reverse the directions of projection of the frame from its supporting arm —4— immediately upon the reversal of the direction of movement of said supporting arm.

The transverse width of the frame —6— between the axis of the supporting arm —4— and scraper edge —8— is considerably greater than the radius of the rollers —13— to cause the frame to assume a relatively sharp angle with the glass —a— when the scraper edge —8— is engaged therewith and thereby to assure a more positive cutting or scraping effect upon the glass as the cleaner is moved across the surface of the glass in the direction of projecting of the frame from the arm —4—.

The opposite sides of the frame —6— are substantially flat while the surface —8′— against which the wipers —9— are clamped is disposed at substantially right angles to a medial line between the scraping edge and axis of the supporting arm —4— and substantially midway between said scraping edge and axis so that when the wipers —9— are clamped to the surface —a— one or the other of its edges will contact with the adjacent surface of the glass to effect a cleaning of said surface immediately following the scraping operation.

These wipers are preferably made of a single piece of rubber or equivalent resilient material of sufficient width to extend beyond the opposite faces of the frame —6— when secured in operative position thereon.

The scraper blade —8— is preferably made of hard rubber, vulcanized fibre or equivalent material, but if desired, may be made of metal and is of sufficient length to extend across the peripheries of the rollers —13— so as to operate upon as large an area as possible.

The hubs —7— are spaced apart axially the major portion of the length of the frame —6— to permit the use of relatively long wipers —9— which are arranged in the recessed portion of the frame for convenience of access to the clamping screws —12— and a clamping plate —12'— which cooperates with the screws to hold the wipers —9— in operative position.

*Operation.*

If the cleaner is moved to the left hand, Figure 1, the contact of the rollers —13— with the front surface of the glass —a— will immediately cause the frame —6— carrying the scraper —8— and wipers —9— to be shifted in a corresponding direction to cause said scraper and one of the wipers to engage the surface of the glass so that the continued movement of the cleaner in the same direction will cause the rollers to slide upon the surface of the glass and thereby to hold the scraper and wiper against said surface.

The movement of the cleaner in the opposite direction or to the right hand will cause the rotation of the rollers and consequent shifting of the frame —6— in the same direction as shown by dotted lines in Figure 3 thereby bringing the scraper edge and the other wiper into contact with the surface of the glass for cleaning the same during the reverse movement of the cleaner, these operations being repeated as frequently as may be desired.

What I claim is:

1. In a windshield cleaner, a frame-supporting arm, and means for moving said arm in reverse directions across the surface of the windshield, a frame having edges journaled on said arm for relatively angular movement and provided with a flat scraper along one edge, rollers secured to the frame co-axial with said arm for rolling engagement with the windshield glass to effect the angular movement of the frame as the arm is moved in reverse directions, and a flexible wiper secured to the frame across the inner edge of the scraper for engagement with said glass.

2. A windshield cleaner comprising a support, a blade mounted on the support and disposed in a plane at an acute angle to the plane of movement of the support for engaging the surface of the windshield, a flexible wiper on the support disposed in a plane substantially normal to the plane of movement of the support and extended beyond opposite sides of the blade, means for moving the support in reverse directions across the windshield, and means for turning the blade on the support through an arc of approximately one-hundred and eighty degrees to present opposite sides of the blade to the windshield as the direction of motion of the support is reversed.

In witness whereof I have hereunto set my hand this 9th day of July, 1927.

FRANCIS H. BLAKE, 2ND.